March 23, 1965  J. E. EYNON  3,174,632
PULPWOOD LOAD ALIGNER
Filed Aug. 14, 1961  3 Sheets-Sheet 1
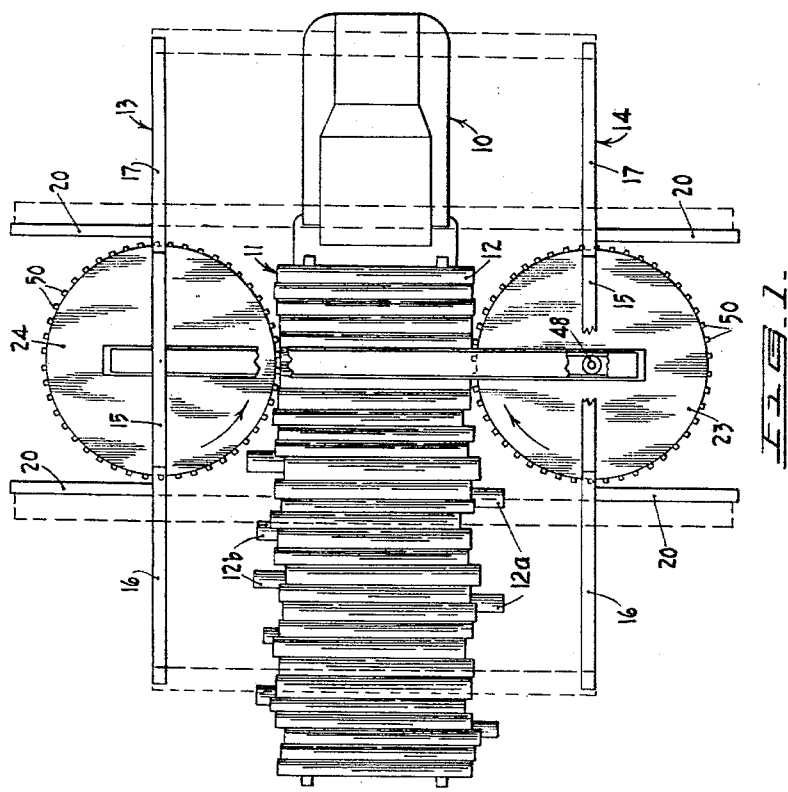
Inventor
John Ernest Eynon
By Stevens, Davis, Miller & Mosher
Attorneys March 23, 1965   J. E. EYNON   3,174,632
PULPWOOD LOAD ALIGNER
Filed Aug. 14, 1961   3 Sheets-Sheet 2
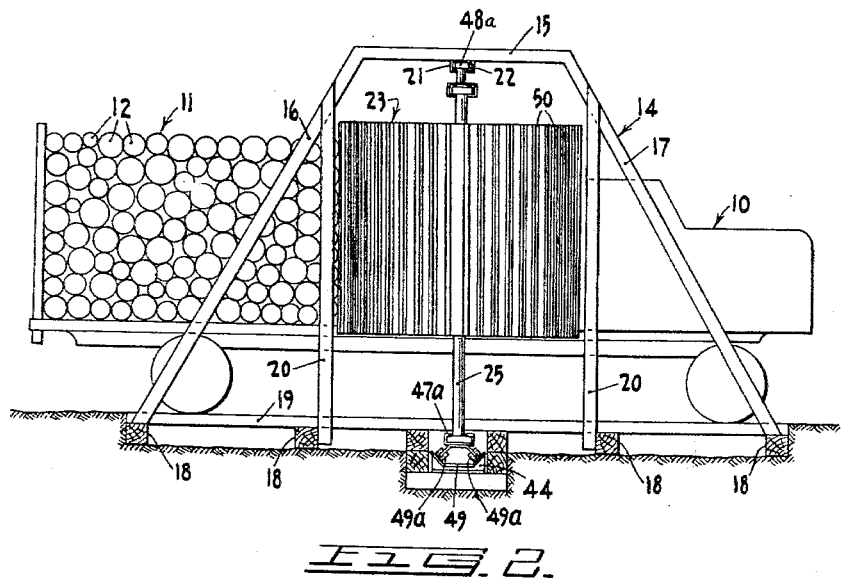
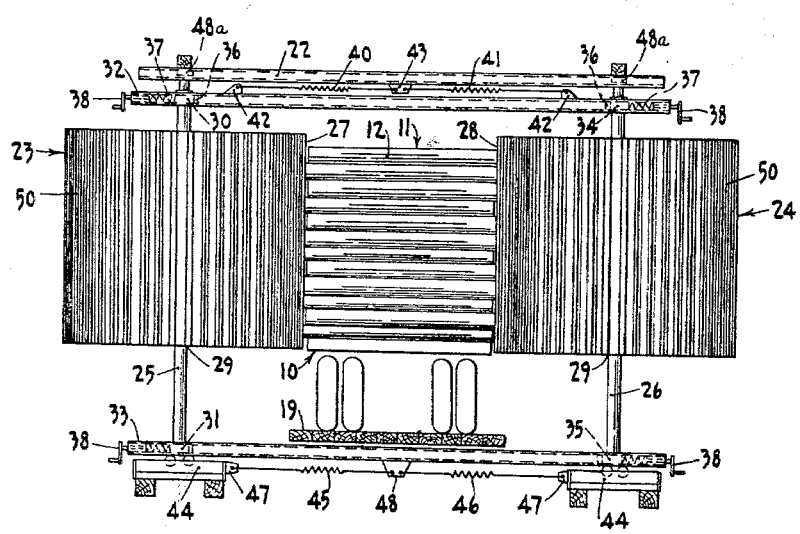
Inventor
John Ernest Eynon
By Stevens, Davis, Miller & Mosher
Attorneys

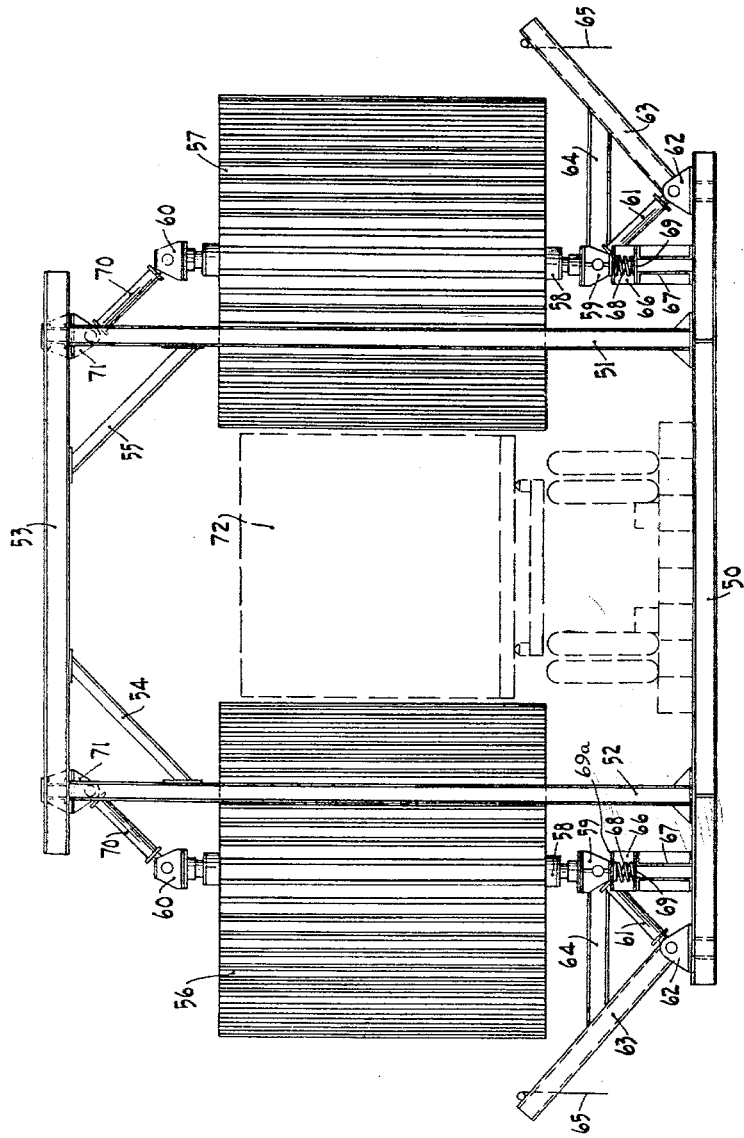

United States Patent Office 3,174,632
Patented Mar. 23, 1965

3,174,632
PULPWOOD LOAD ALIGNER
John Ernest Eynon, Fort William, Ontario, Canada, assignor to Abitibi Power & Paper Company, Limited, Iroquois Falls, Ontario, Canada, a corporation of Canada
Filed Aug. 14, 1961, Ser. No. 131,253
Claims priority, application Canada, Nov. 28, 1960, 811,921
7 Claims. (Cl. 214—6)

This invention relates to a load aligner and more particularly to an apparatus suitable for aligning logs such as pulpwood bolts piled cross-wise upon trucks, trailers or other vehicles.

Devices have previously been proposed for aligning loads but these have generally been complex and have required their own power source.

The object of this invention is to provide an improved apparatus for aligning logs extending transversely of a vehicle which is simple in construction in which the motive power of the vehicle is utilized and in which an individual operator apart from the driver of the vehicle is not required.

A further object of this invention is to provide a load aligner which will minimize delay and yet which can handle a load of any length and which is efficient in operation.

In the drawings which illustrate the preferred embodiment of this invention:

FIGURE 1 is a plan view of an apparatus in accordance with this invention.

FIGURE 2 is a side elevation view corresponding with FIGURE 1.

FIGURE 3 is an end elevation view corresponding with FIGURES 1 and 2.

FIGURE 4 is an end elevation view showing an alternative embodiment of this invention.

Referring now to the drawings, a vehicle 10 which in this instance is a truck but which might also be a trailer has loaded on it a pile 11 of pulpwood bolts 12 extending crosswise of the vehicle. Some of the pulpwood bolts such as bolt 12A are illustrated as extending on one side of the vehicle and others such as 12B extend on the other side of the vehicle.

The apparatus for aligning logs such as 12A and 12B provided in accordance with this invention comprises frame members 13 and 14. Each comprise upper portion 15 and inclined side portions 16 and 17, frame portions 16 and 17 mounted on a platform comprising cross pieces 18 and planks 19. Planks 19 provide a ramp to support vehicle 10.

Suitable reinforcing members such as 20 are connected to frame 14 and to the cross pieces 18 of the platform. Members 20 extend outwardly and standardly to provide a buttressing action thereby absorbing the reaction resulting from the alignment of the load. A transversely extending track is defined by a pair of opposed channel members 21 and 22 which are secured to frame portions 15. A pair of drums 23 and 24 respectively are rotatably mounted on shafts 25 and 26 respectively. The adjacent surface portions 27 and 28 of drums 23 and 24 are normally spaced about the average width of the load, which will be the length of a pulpwood bolt. Drums 23 and 24 are rotatably mounted by means of conventional bearings (not shown) indicated at 29. Shaft 25 has an upper bearing block 30 and a lower bearing block 31 in engagement with channels 32 and 33 respectively, which channels provide a floating framework. Similarly, shaft 26 has bearing blocks 34 and 35 engaging channels 32 and 33 respectively. Stops such as 36 limit movement of bearing blocks such as 30 in a direction towards the centre but compression springs such as 37 permit their movement in an outward direction. Adjustment screw 38 varies the loading of spring 37 which bears on block 36 so as to control pressure required to force drums 23 and 24 apart. Channel 32 is mounted on channel members 21 and 22 in a floating manner by means of tension springs 40 and 41 which are connected to lugs 42 on channel member 32 and 43 on channel members 21 and 22. Similarly supporting members 44 are connected by springs 45 and 46 to channel 33 through lugs 47 and 48 to give a floating mounting of channel member 33. Supporting members 44 include a track 49 engaged by rollers 49a which in turn are carried by flange 47a mounted at the base of shaft 25. In a similar manner thrustwheel 48a fits within the track provided by channels 21 and 22.

It is preferred that the surface of each of drums 23 and 24 have a series of vertically extending bars 50 to provide frictional engagement of the ends of the pulpwood bolts.

When it is desired to align the ends of the pulpwood bolts piled on a vehicle, the operator drives the vehicle 10 along the ramp between drums 23 and 24.

As the load passes between drums 23 and 24, the drums are caused to rotate providing a rolling action which straightens a few logs at a time until the load is aligned. In the majority of cases a single pass may be sufficient but sometimes the operator of the vehicle may find it necessary to make several passes or reverse for a short distance and then go forward. Compression springs 37 allow for variations in the spacing of the drums due to individual overlength bolts. The floating frame construction supported by springs such as springs 40, 41, 45 and 46 provide for the alignment and centering of the drums 23 and 24 with repsect to the vehicle.

It will be noted that any load length can be handled and that no engine is required for the operation of drums 23 and 24. Furthermore, the only operator needed is the driver of the vehicle.

In the alternative embodiment shown in FIGURE 4, there is provided a platform 50 upon which vertical frame members 51 and 52 are mounted. Transverse frame member 53 is located to connect the upper ends of frame members 51 and 52. Bracing members 54 and 55 are connected between transverse member 53 and upright frame members 52 and 51 respectively. Drums 56 and 57 have shafts 58 which are journalled at the lower end on bottom swing beam 59 and the upper end on top swing beam 60. A bottom swing arm 61 is connected between bottom swing beam 59 and bottom bearing bracket 62 which is mounted on platform 50. The swing beam 59 is pivotally connected to swing arm 61 which in turn is pivotally mounted at bearing bracket 62. A counter-weight arm 63 is joined by link 64 to bottom swing beam 59, is pivotally mounted at one end in bottom bearing bracket 62 and at its other end supports a counter-weight basket (not shown), in which suitable weights may be placed, by cable 65. Bottom swing beam 59 is additionally mounted on buffer plate 69a of a buffer assembly which includes a box 66 vertically telescoping with supporting member 67 and including buffer springs 68. Buffer springs 68 are mounted on a plate 69 which in turn is supported by member 67. The swing beam sits on the buffer plate 69a, being supported by but not connected to same. When sufficient horizontal outward pressure is exerted on the drum, the action is such that the swing beam 59 moves in a vertical arc about the pivot point at 62 thus moving both vertically and horizontally. Top swing beam 60 is connected by top swing arm 70 to top bearing bracket 71 which is mounted on transverse frame member 53. It will be apparent that the structure shown in FIGURE 4 operates substantially similarly to that shown in FIGURES 1 to 3 when truck 72 is driven between drums 56 and 57 except that the inward pressure is exerted by the weight of drums 56 and 57. However in the embodiment of the invention shown in FIGURE 4 the drum axes of course do not remain vertical as they are outwardly displaced. This effect is not detrimental to the overall effectiveness of the machine as the required range of outward displacement is not great enough to cause undesirable inclination of the drums from the vertical.

In particular in regard to the operation of FIGURE 4, in as much as the angle of the swing arms, 61 and 70 to the vertical is about forty-five degrees, the drums 56 and 57 will have a reaction to an outward displacement force about equal to their weight. The necessity for tension springs is therefore eliminated. Therefore as the load 72 passes between the drums, protruding logs are pushed in by the rolling action of the drums (as in the previously described embodiment shown in FIGURES 1, 2 and 3). When overlength logs or logs which cannot be pushed into alignment because of fouling are encountered, one or both drums are displaced outwardly. As a drum moves horizontally it is also raised by virtue of the inclined swing arm thus storing kinetic energy for return of the drum to its proper gauge width once the obstruction is passed. As previously described in connection with FIGURES 1, 2 and 3, it may also be necessary to make more than one pass to completely align the load.

I claim:

1. An apparatus for aligning a load of logs extending transversely of a vehicle comprising a roadway along which a vehicle may be moved, a supporting framework having portions on each side of said roadway, a pair of drums resiliently and rotatably mounted on said framework the centres of rotation of said drums being on opposite sides of the roadway and being on a line extending substantially transverse to the centre line of the roadway with the surfaces of said drums being spaced to permit said vehicle with its load to be driven between said drums with said drums bearing on the ends of said logs at least one of said drums being movable away from the other of said drums to accommodate variations in the length of the logs in said load.

2. An apparatus as in claim 1 in which said drums are mounted on a floating framework which is in turn mounted on said supporting framework, said floating framework being movable transversely to align said drums with said vehicle.

3. An apparatus as in claim 2 in which said drums are mounted in said floating framework by means including inwardly acting resilient means adapted to permit temporary enlargement of the spacing between said drums.

4. An apparatus as in claim 1 in which said drums are mounted on said frame work by means of swinging arms arranged so that the weight of the drum acts inwardly against the ends of the logs of said load.

5. An apparatus as in claim 4 in which one of said swing arms is located at the top of each drum and another of said swing arms is located at the bottom of each drum and in which said swing arms are upwardly and inwardly inclined.

6. An apparatus as in claim 4 in which each of said drums is mounted on a vertically acting buffer and in which counter-weight means is provided to control the inwardly acting component of the weight of the drum.

7. An apparatus of aligning a load of logs extending transversely of a vehicle comprising a roadway along which a vehicle may be moved, a supporting framework having portions on each side of said roadway, a pair of drums each of which is freely rotatable about a substantially vertical axis and spaced to permit said vehicle with its load to be driven between said drums with said drums bearing on the ends of said logs the centres of rotation of said drums being on opposite sides of the roadway and being on a line extending substantially transverse to the centre line of the roadway and connecting means between said drums and said portions of the supporting framework providing a mounting for said drums and causing a component of the weight of at least one of said drums to be applied against the ends of said logs to align said logs, said connecting means permitting at least one of the drums to move away from the other of said drums to accommodate variations in the length of the logs in said load.

References Cited in the file of this patent
UNITED STATES PATENTS

| | | |
|---|---|---|
| 707,951 | Alexander | Aug. 26, 1902 |
| 718,543 | Starks | Jan. 13, 1930 |
| 1,843,281 | Hoodless | Feb. 2, 1932 |
| 1,860,143 | Fuller et al. | May 24, 1932 |
| 2,258,461 | Marsden | Oct. 7, 1941 |
| 2,429,071 | Pirie | Oct. 14, 1947 |
| 2,432,988 | Green | Dec. 23, 1947 |
| 2,671,416 | Steadman | Mar. 9, 1954 |
| 2,745,566 | Bouffard | May 15, 1956 |
| 3,023,916 | Purse | Mar. 6, 1962 |

FOREIGN PATENTS

| | | |
|---|---|---|
| 615,384 | Great Britain | Jan. 5, 1949 |